United States Patent
Wood et al.

(10) Patent No.: US 7,318,717 B2
(45) Date of Patent: Jan. 15, 2008

(54) METHOD AND APPARATUS FOR FORMING FIBER REINFORCED COMPOSITE PARTS

(75) Inventors: Michael D. Wood, South Bend, IN (US); Mark L. LaForest, Granger, IN (US); Neil Murdie, South Bend, IN (US); Dean S. Kriskovich, Avon, IN (US); Vernon R. Hudalla, Charlotte, NC (US); Thaddeus W. Gonsowski, Osceola, WI (US)

(73) Assignee: Honeywell International Inc., Morristown, NJ (US)

( * ) Notice: Subject to any disclaimer, the term of this patent is extended or adjusted under 35 U.S.C. 154(b) by 1162 days.

(21) Appl. No.: 10/315,464

(22) Filed: Dec. 10, 2002

(65) Prior Publication Data

US 2003/0108635 A1    Jun. 12, 2003

Related U.S. Application Data

(62) Division of application No. 09/527,322, filed on Mar. 16, 2000, now Pat. No. 6,521,152.

(51) Int. Cl.
*B29C 67/00* (2006.01)
(52) U.S. Cl. .................. 425/120; 425/24; 425/200; 425/447; 425/110; 425/117; 425/130; 425/DIG. 108; 427/228; 264/29
(58) Field of Classification Search ............... 427/228; 264/29; 425/24; *B29C 67/00*
See application file for complete search history.

(56) References Cited

U.S. PATENT DOCUMENTS 3,348,886 A * 10/1967 Hergeth ...................... 198/493
3,594,877 A     7/1971 Suda et al.
3,621,945 A    11/1971 Spry
3,732,345 A     5/1973 Amos et al.
3,917,884 A *  11/1975 Jahn .......................... 427/228
4,002,225 A     1/1977 Marin
4,611,445 A     9/1986 Pressley
4,708,268 A *  11/1987 Wurtz ......................... 222/238

(Continued)

FOREIGN PATENT DOCUMENTS

EP          0402915 A2    12/1990

(Continued)

*Primary Examiner*—Robert B. Davis
*Assistant Examiner*—G. Nagesh Rao
(74) *Attorney, Agent, or Firm*—Birch, Stewart, Kolasch & Birch, LLP

(57) ABSTRACT

A method and apparatus for combining raw fibrous and binding materials in a single mixing step (Step S3), followed by consolidation (Step S5) so as to greatly shorten the overall cycle time to a finished fiber-reinforced composite part. Chopped fibrous materials and binder materials are deposited sequentially onto a belt conveyor (Step S2) so that the materials are successively layered, one on top of each other in a predetermined ratio, and subsequently mixed (Step S3) to achieve uniform dispersion throughout. The mixed materials are then deposited into a rotating mold (Step S4) to further ensure uniform dispersion of fibrous and binder materials. Impregnation of the fibrous materials with the binder material occur in-situ as the uniformly mixed materials are heated and subsequently compacted in the mold (Step S5) to obtain the desired shape of the fiber-reinforced composite part.

15 Claims, 7 Drawing Sheets

U.S. PATENT DOCUMENTS

| | | |
|---|---|---|
| 5,147,588 A | 9/1992 | Okura et al. |
| 5,236,639 A | 8/1993 | Sakagami et al. |
| 5,310,025 A | 5/1994 | Anderson |
| 5,540,305 A | 7/1996 | Hammond et al. |
| 5,576,358 A | 11/1996 | Lem et al. |
| 5,634,535 A | 6/1997 | Fennell et al. |
| 5,744,075 A | 4/1998 | Klett et al. |
| 5,814,255 A | 9/1998 | Weiser et al. |
| 5,879,601 A * | 3/1999 | Baker ..................... 264/112 |
| 5,931,214 A * | 8/1999 | Spicer et al. ............ 164/258 |

FOREIGN PATENT DOCUMENTS

| | | |
|---|---|---|
| EP | 0492491 A1 | 7/1992 |
| WO | 98/43809 A1 | 10/1998 |

* cited by examiner

METHOD AND APPARATUS FOR FORMING FIBER REINFORCED COMPOSITE PARTS

This is a division of U.S. patent application Ser. No. 09/527,322 filed Mar. 16, 2000, now U.S. Pat. No. 6,521,152 B1.

BACKGROUND OF THE INVENTION

1. Field of the Invention

The present invention relates to a method and apparatus for forming fiber reinforced composite parts.

2. Description of the Related Art

Fiber-reinforced composite structures, such as carbon-carbon composites for example, are widely used as friction materials for heavy-duty brakes in automobiles, trucks, and aircraft. This is because they exhibit high thermal conductivity, large heat capacity, and excellent friction and wear characteristics and thus can provide excellent performance.

However, past manufacturing processes for producing these fiber-reinforced composite structures were often lengthy undertakings, requiring months to fabricate a single part. In one example, a typical fiber-reinforced composite part was prepared by a non-woven process that involved needle-punching layers of carbon fibers to form a preform, a slow, time-consuming process. When two or more layers of fibers are needle punched together by metal needles having barbs on one end, the barbs commingle fibers from a particular layer into successive layers. The commingled fibers essentially stitch the layers of fiber together. This nonwoven technology achieved preform densities on the order of about 0.5 g/cc. To obtain a final composite part, the preform was subsequently infiltrated with a matrix binder material via a chemical vapor deposition ("CVD") or chemical vapor infiltration ("CVI") process, for example. CVD and CVI are used interchangeably for the purposes of the present application.

In another process, a preform was prepared by building up successive layers of pre-impregnated carbon fiber fabric. Tows (the term "tow" is used hereinafter to refer to a strand of continuous filaments) of carbon fiber were woven into a two-dimensional fabric, and thereupon dipped into a liquid bath to impregnate the fabric with a liquid resin. The resin-impregnated fabric was then pulled between rollers to form a sheet of pre-impregnated carbon-fiber fabric. After impregnation, the fabric was dried and b-staged under low heat. A plurality of desired shapes were then cut out of the sheet material and stacked within a mold, and subsequently cured using heat and pressure to obtain the desired composite part. In order to produce a carbon-carbon component, the composite part is carbonized which creates internal porosity. Multiple infiltration cycles using CVD or resin were required to achieve final density of the composite part. For this reason, it often took a term of several months to obtain a final product, causing the product to be extremely expensive. Further, much material was wasted in order to obtain the final product.

Several processes have been developed in order to reduce overall processing time needed to manufacture a fiber reinforced composite part. One process, a "random-fiber process", uses entirely tow material. Somewhat similar to the pre-impregnating method described above, in the random-fiber process a continuous tow of fiber is dipped through a resin bath, dried, and then chopped to a desired length. The resin coated chopped fibers are then placed into a mold and cured using heat and pressure. However, the steps of impregnating the continuous tow are performed separately from the molding and curing required to create the composite part, thereby extending the "process cycle" of manufacturing the composite part.

Another method involves a molding compound process whereby chopped fibrous material are mixed with a resin so as to form a continuous sheet of mixed material. A plurality of desired shapes are then cut out of the sheet material and stacked within a mold, and subsequently cured using heat and pressure to obtain the desired composite part. Again, this process requires extensive time and wastes material in order to obtain the final product.

A further process developed to shorten the manufacturing time involves using a liquid slurry to mix the fibrous material with a resin powder, as illustrated in U.S. Pat. No. 5,744,075 to Klett et al. However, the fibrous material needs to be chopped into small pieces (on the order of ¼ to ½ inch (about 0.6-1.3 cm)) so as to attain a uniform mix with the resin powder in the slurry. Thus, longer chopped fibers (1-1 ½ inches (about 2.5-3.8 cm)) do not work well in this liquid slurry method, since a uniform dispersion of fibrous material and resin powder in the slurry cannot be attained with the longer chopped fiber lengths. The longer fibers tended to "ball-up" during mixing with the powdered resin and during deposition into the mold, making it difficult to obtain a uniform end product. Moreover, this "balling effect" directly contributed to the "loftiness" of the preform, a disadvantageous result of the water slurry method since a lofty preform was difficult to control within the mold. Additionally, an excess step of drying the preform was required (i.e., removing the water from the preform in the heating step is required before pressing the materials into a composite part).

Recent developments have introduced a method and apparatus that combines chopped fibers and a powdered resin utilizing a dry-blending process. Such a dry-blending process and apparatus 100 is illustrated in the rough schematic diagram of FIG. 1. Apparatus 100 includes a first lower enclosure 101 connected to a second upper enclosure 102 via a neck portion 119. First enclosure 101 has an adjuster 120 connected thereto which houses compressed air lines 121 and 124 for feeding air jets 122. Second enclosure 102 houses a screen 126, and has a funnel 132 and vacuum line 135 connected thereto.

In FIG. 1, chopped tow 115 is loaded into first enclosure 101, where air jets 122 feed compressed air into the chopped tow 115 within first enclosure 101. The compressed air fed via compressed air lines 121 and air jets 122 enters below the level of chopped tow in first enclosure 101. This compressed air forces the chopped tow 115 into upper portion 117 of first enclosure 101 such that the individual fibers of the chopped tow 115 are entrained in air and further broken-up (defibrillated) into smaller strands or filaments 118. Adjuster 120 maintains the compressed air jets 122 at a level equal to or below the chopped tow 115 within first enclosure 101.

The broken-up fibers 118 entrained in air in the upper section 117 are then forced through neck portion 119 into a second enclosure 102, whereby they are mixed with a powdered resin 130 fed through at funnel 132 of second enclosure 102. The powder resin 130 mixes with the broken-up fibers in a powder and fiber mixing region 140, whereupon the "mixed materials" settle at the bottom of second enclosure 102 to form a layer which constitutes the building-up of a preform 125. The mixed materials fall due to a vacuum 135 being applied to the bottom of second enclosure 102 which removes the bulk of the air volume in second enclosure 102, thereby allowing the mixed materials to fall and condense at the bottom of second enclosure 102 on top of screen 126.

The "dry-blending" apparatus of FIG. 1 provides a medium for mixing the powder 130 with the fibrous material (chopped tow 115) to attain a uniform mixture of the binder material with the fibrous material. However, in the apparatus 100 of FIG. 1, the proportions of chopped fiber and binder material have to be first individually weighed out to obtain the proper proportions, before being loaded in enclosures 101 and 102 to be mixed in mixing region 140. Further, apparatus 100 of FIG. 1 is limited to a single-batch process, i.e., to make one final fiber-reinforced composite part, the individual proportions for each fibrous material and binder material have to be weighed and added individually for each preform made.

Yet a further process to shorten the manufacturing cycle time of a composite part is illustrated in U.S. Pat. No. 5,236,639 to Sakagami et al. The objective of this process is to provide excess carbon material to fill pores in the matrix material during subsequent curing and carbonization steps, thus producing a carbon-carbon composite material that requires no repetition of production steps including any further densification of the composite material. This involves mechanically mixing a matrix carbon material and carbon fibers in proportions that are determined on the basis of the carbonization ratio of the matrix material and on the basis of the desired ratio of fibers to be contained in a resultant end product. However, such a process requires the use of excess carbon matrix material, a curing step under pressure after formation of an intermediate-formed part such as a preform or mold, and also requires subsequent carbonization and graphitization of the cured intermediate part, both under pressure, to obtain the final fully-densified composite part. Of course, no further production steps are required or repeated, including densification of the composite material. However, it is costly and time consuming to perform the curing, carbonization and graphitization all under pressure.

Therefore, what is desired is a method and apparatus which would feed, blend, and deposit various lengths of chopped fibrous and binder materials into a mold of a desired final shape, wherein the raw fibrous materials and binder materials are combined in a single step, followed by consolidation of the materials. The resultant preform would not require any curing or carbonization under pressure during the follow-on heating processes to manufacture the final composite part. Such a method and apparatus would provide fiber-reinforced composite parts with densities that are higher than achieved with current technologies, and would decrease overall cycle time to a finished composite part. The method can be used to provide an intermediate preform product that is subsequently stabilized, carbonized, optionally heat treated, densified, and final heat treated to provide a carbon-carbon composite material.

SUMMARY OF THE INVENTION

The present invention provides a method and apparatus for combining raw fibrous and binding materials in a single mixing step, followed by consolidation so as to greatly shorten the overall cycle time to a finished fiber-reinforced composite part. In the method, chopped fibers, which can include single length or multiple lengths of fibrous material, and a powdered resin binder material are combined in a continuous process at predetermined ratios, mixed together, and deposited into a mold having the shape of the final product. Specifically, the chopped fibrous materials and binder materials are deposited sequentially onto a belt conveyor so that the materials are successively layered in a predetermined ratio, and subsequently mixed to achieve uniform dispersion throughout. The "mixed materials" are then deposited into a rotating mold to further ensure uniform dispersion of fibrous and binder materials, wherein impregnation of the fibrous materials with the binder material occurs in-situ as the uniformly mixed materials are heated in the mold, and subsequently compacted to obtain the final desired shape of the preform. The resultant preform requires no excess use of matrix material, no curing or carbonization under pressure in the follow-on heating processes required to obtain the intermediate fiber-reinforced composite part.

Objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, wherein like elements are represented by like reference numerals, which are given by way of illustration only, and thus are not limitative of the present invention and wherein.

DETAILED DESCRIPTION OF THE PREFERRED EMBODIMENT

The method and apparatus in accordance with the preferred embodiment enables the production of fiber-reinforced composite parts suitable for use in manufacturing various components, including materials for high-friction applications such as automobile, truck, and aircraft brakes. By combining fibrous materials with a binder material in a single apparatus, a fiber-reinforced composite part with improved friction and wear performance can be produced in fewer processing steps as compared to the current techniques of the related art used to fabricate fiber-reinforced composite materials, thereby providing increased reliability and reduced process cycle times. Additionally, the preferred embodiment allows for more complete control over defibrillation of carbon fibers so as to obtain a sufficient balance between strength/wear properties with adequate dispersion of mixed carbon fiber and matrix resin materials, as compared to other manufacturing processes such as using a liquid slurry, for example.

Figure 1:
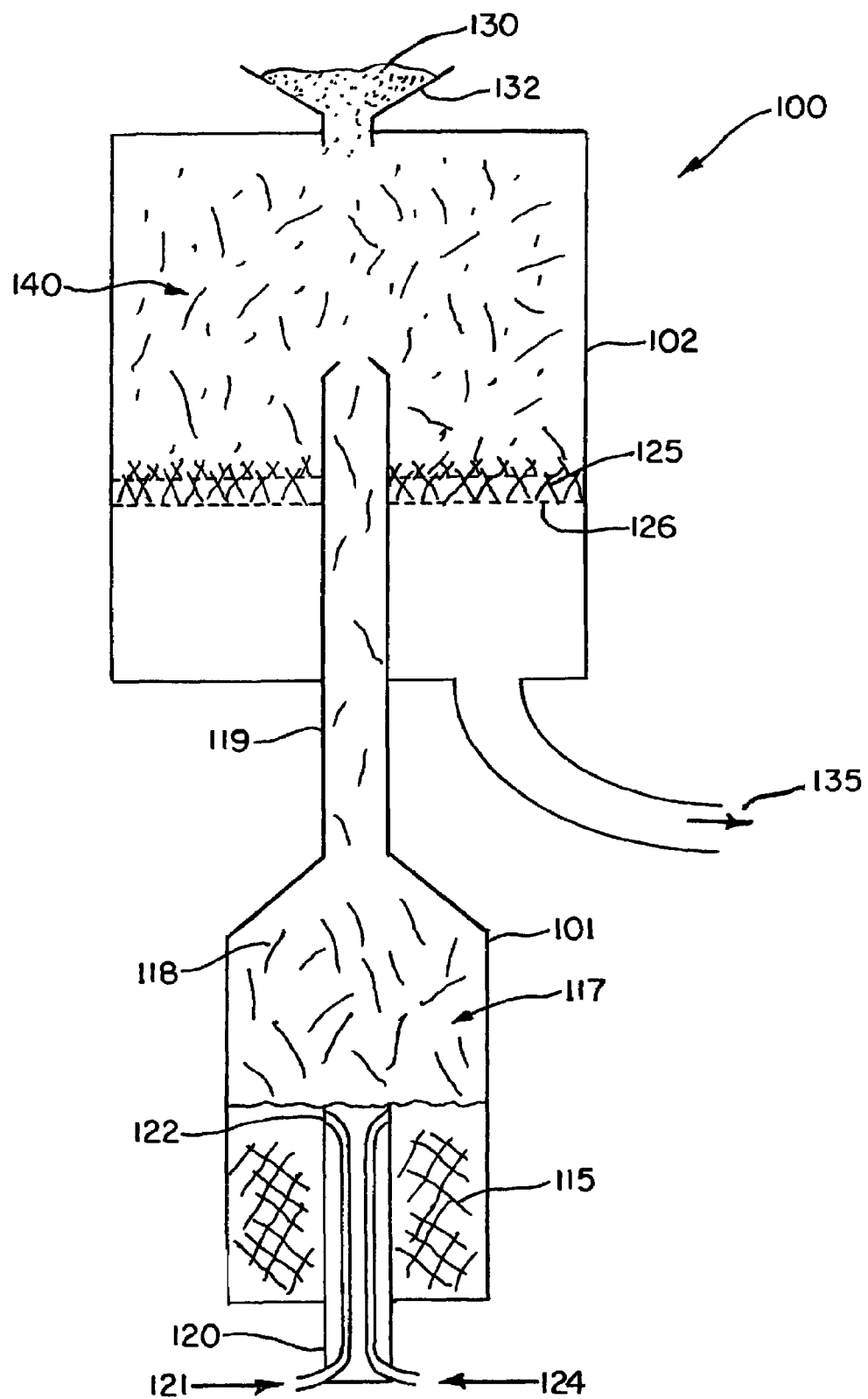
FIG. 1 illustrates a conventional dry-blending apparatus.
Figure 2:
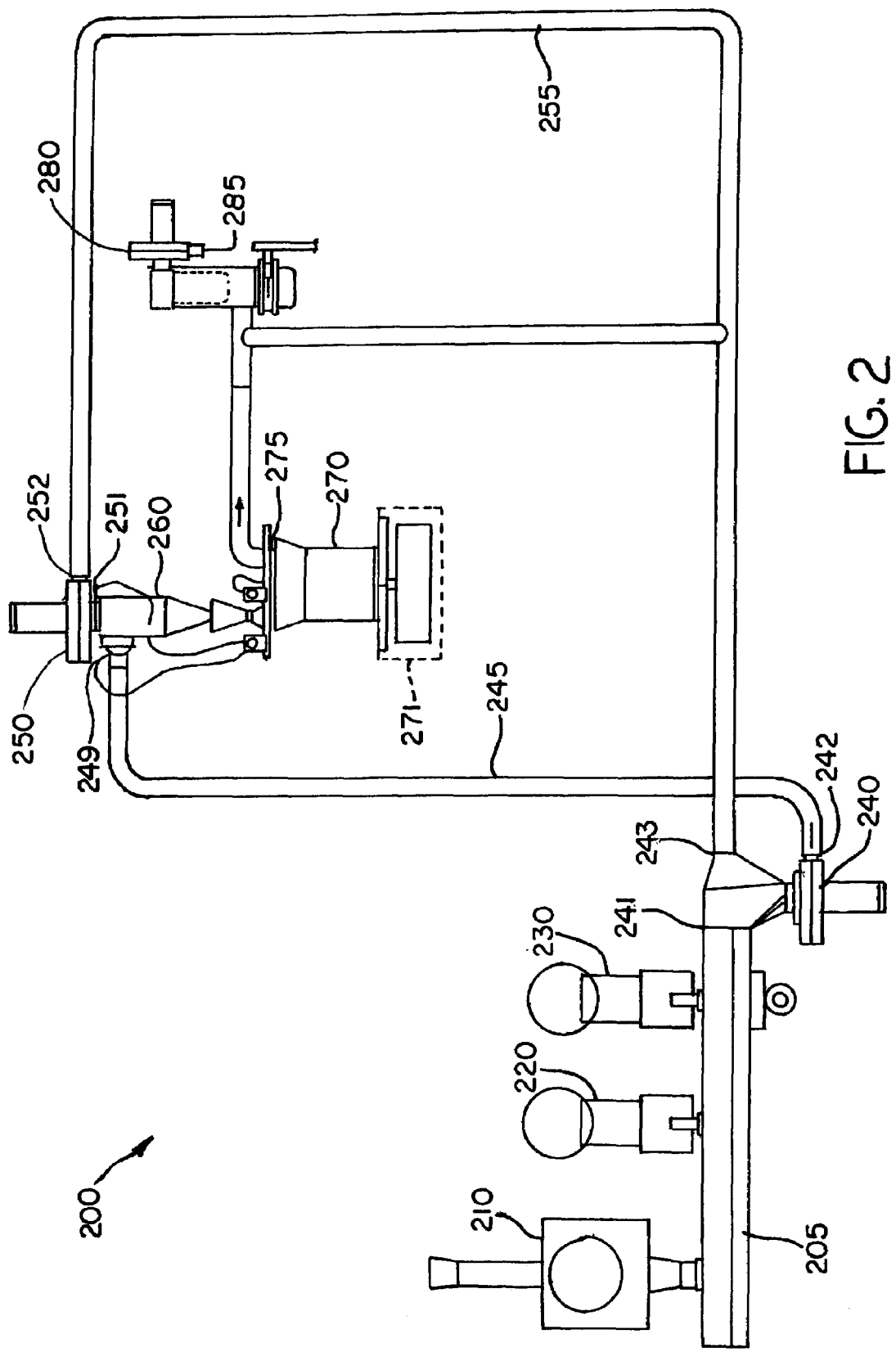
FIG. 2 is a schematic diagram of the equipment and major components used in accordance with the preferred embodiment of the present invention.

FIG. 2 illustrates a schematic diagram of the equipment used in accordance with the preferred embodiment. Referring to FIG. 2, the fiber-reinforced composite apparatus 200 includes a series of feeders 210, 220, and 230, and a constituent transport arrangement, preferably a conveyer belt 205, which is situated below the feeders and adjacently mounted to a first inlet 241 of a material handling fan 240. An outlet 242 of the material handling fan 240 connects to inlet 249 of a cyclone dust collector 260 via line 245. A return air fan 250 takes a suction off the cyclone dust collector 260 at point 251. Additionally, the return air fan 250 includes an outlet 252 which is connected to a second inlet 243 of material handling fan 240 via a line 255. The cyclone dust collector 260 is arranged above a mold 270 that rests on a rotational device 271. Further, fiber-reinforced composite apparatus 200 includes a dust filter fan 280 that takes a suction from mold 270 at 275.

Feeder 210 may feed reinforcing fibers between about 0.5-1.5 inches (about 1.3-3.8 cm) in length at a first predetermined rate. Preferably, feeder 210 feeds 1-inch (2.54 cm) fibers (hereinafter "reinforcing fiber"); however, reinforcing fibers longer than 1.5 inches (3.8 cm) may be used. Feeder 220 may feed milled and short fibers between about 0.004 inch (0.1 mm) and ½ inch (1.27 cm) in length, and preferably feeds 0.004 inch (0.1 mm) length fiber (hereinafter "milled fiber") at a second predetermined rate. The milled fiber acts as a "filler" fiber to fill in gaps between the longer reinforcing fibers. Feeder 230 can be a resin feeder which feeds a resin binder material at a third predetermined rate. Alternatively, the fibrous materials from feeders 210 and 220 can be the same size (for example, equal length fibers up to about 1.5 inches (3.8 cm) in length. It is advantageous to use a mixture of longer and shorter fibers to obtain better friction and wear properties while still maintaining adequate strength in the finished component. The longer fibers provide the strength, while the shorter fibers fill in gaps between the longer fibers and the matrix material to help increase the final density of the intermediate-formed part/preform, and/or of the final composite part.

The chopped reinforcing and milled fibrous materials can be polyacrylonitrile (PAN) based carbon fibers, preferably to be used for fabrication of carbon-carbon composite parts. However, glass fibrous material or other reinforcing fibrous material such as metal fibers and synthetic fibers, for example may be used, depending on the resultant composite part to be fabricated. The binder material can be a high-carbon yielding mesophase pitch resin matrix (i.e., in powdered form); however, phenolic resins and other thermoplastic or thermosetting resin materials in powdered form may be used as the binder material, depending on the resultant composite part to be fabricated.

The fibrous chop and resin binder fed from feeders 210, 220, and 230 are deposited onto a belt conveyor 205 as a series of continuous, stacked layers. This provides for a semi-continuous process whereby the feeders contain a sufficient amount of materials to produce many composite parts. The stacked layers travel along belt conveyor 205 to be dispensed into a material handling fan 240. Material handling fan 240 mixes the fibrous and binder materials, while partially or fully defibrillating the chopped fiber materials from feeders 210 and 220. Alternatively, the fibrous chop and resin from the feeders may be fed directly into the material handling fan without a belt conveyer.

Material handling fan 240 further provides a volume of air flow to convey the "mixed materials" via a line 245 to cyclone dust collector 260. The cyclone dust collector 260 receives the air-entrained mixed materials and separates the solid particles from the air used to convey them. Return air fan 250 takes a suction off of cyclone dust collector 260 to circulate the bulk of the air volume coming from line 245 back to the material handling fan 240 via line 255, allowing the remaining mixed materials to gently exit the bottom of the cyclone dust collector 260 into mold 270. Dust filter fan 280 removes any residual dust created by the deposition of the mixed materials into the mold 270, and deposits dust particles into dust collector 285. To further ensure uniform deposition of the mixed materials from cyclone dust collector 260 into mold 270, the mold can be arranged on a rotation device 271.

Figure 3:
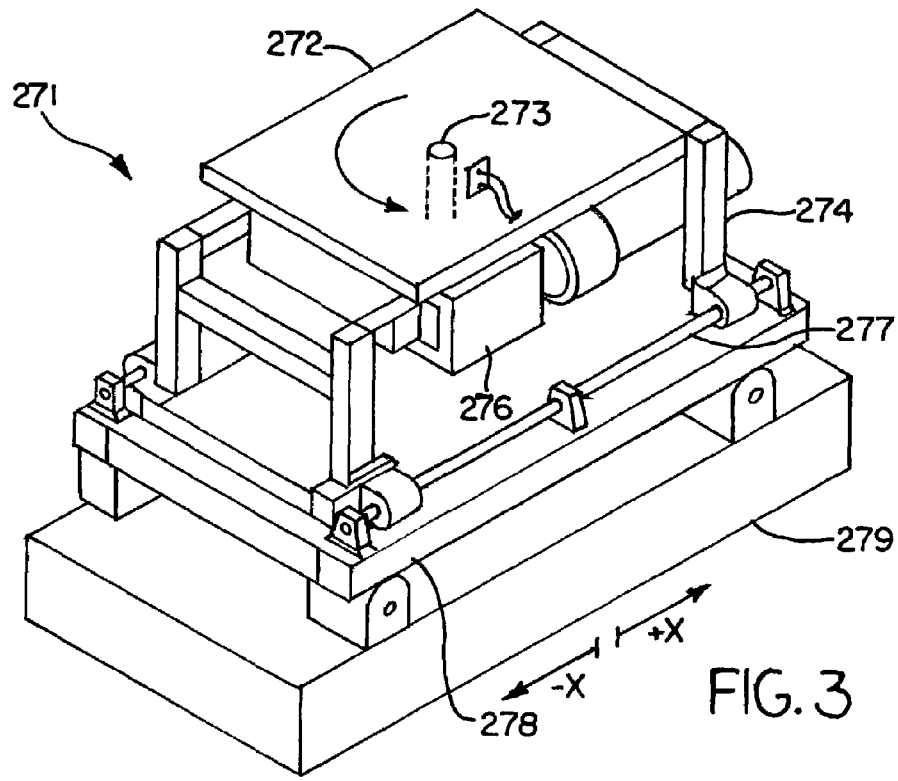
FIG. 3 illustrates a device to rotate the mold in accordance with the preferred embodiment of the present invention.

FIG. 3 illustrates a rotation device 271 to rotate mold 270 in accordance with the preferred embodiment of the present invention. Rotation device 271 includes a turntable 272 mounted upon a support 274 and connected to an electric motor 276 by a rotating spindle 273. Support 274 (along with turntable 272 and electric motor 276) can be jogged back and forth via air cylinders 277, and rests on a linear actuator 278. The entire assembly is supported by a lift table 279.

Turntable 272 and the combination of the air cylinders 277 and linear actuator 278 provide rotational and linear motion for mold 270 during the deposition process. In operation, turntable 272 is powered by electric motor 276 via the spindle 273 to rotate the mold. Simultaneously with this rotation, mold 270 may be reciprocated in a +X and –X direction for the duration of the deposition process by air cylinders 277, the cylinders essentially jogging the support 274 supporting the turntable 272. The mold 270 is aligned to the outlet of the cyclone dust collector 260 such that it can be moved up to four (4) inches to either side of the centerline of the cyclone dust collector 260 by adjusting linear actuator 278 (for example, the linear actuator "distance" can be set at positions such as –1.0" (–2.54 cm) or +2.5" (+6.35 cm) from the centerline of the cyclone dust collector 260). The jogging action imparted by air cylinders 277, together with the rotation imparted by turntable 272, ensures that the mixed material falling from the bottom of the cyclone dust collector 260 is uniformly dispersed in the mold 270 as the mold 270 fills to a desired level, in preparation for a subsequent consolidation step to be discussed later below.

Figure 4:
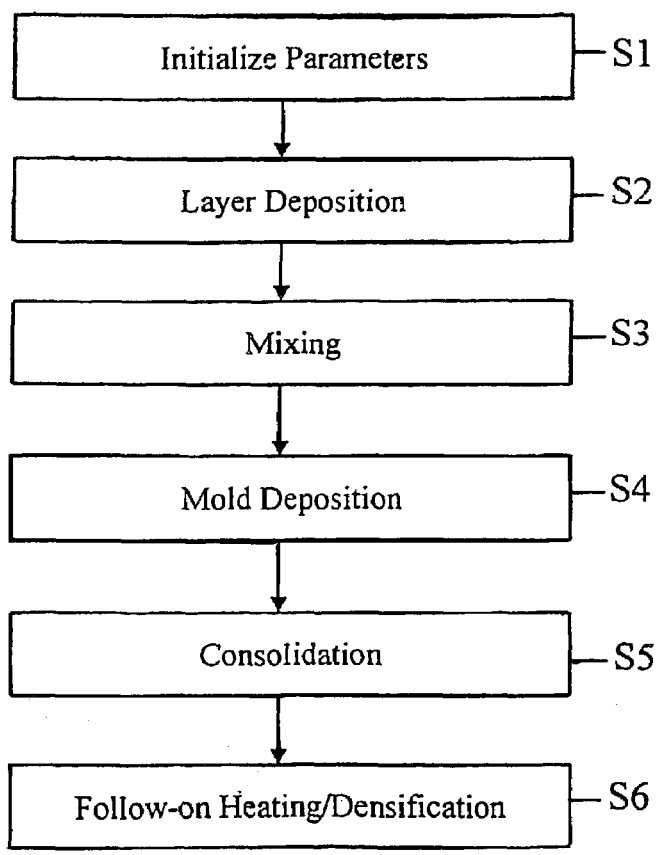
FIG. 4 illustrates general processing steps performed in accordance with the preferred embodiment of the present invention.

FIG. 4 illustrates a process by which fibrous material and binder materials are combined to manufacture a fiber-reinforced composite part in accordance with the preferred embodiment. All parameters for operation are initialized prior to operating the fiber-reinforced composite apparatus 200 (Step S1). This includes determining the rates at which the fibrous and binder materials will be gravimetrically fed from feeders 210, 220, and 230, respectively, onto conveyor belt 205. These rates are determined by a programmable logic controller (PLC) (not depicted) running a software application, and are based on the desired ratios of these materials in the final formed fiber-reinforced composite part. Additionally, fan speeds are pre-set for each of the material handling fan 240, return fan 250, and dust filter fan 280, and preferably do not change throughout the entire manufacturing operation. Further, the belt conveyor speed for belt conveyor 205 and the turntable rotational speed and linear actuator distance for rotation device 271 are set, and preferably do not change throughout the entire manufacturing operation.

Figure 5:
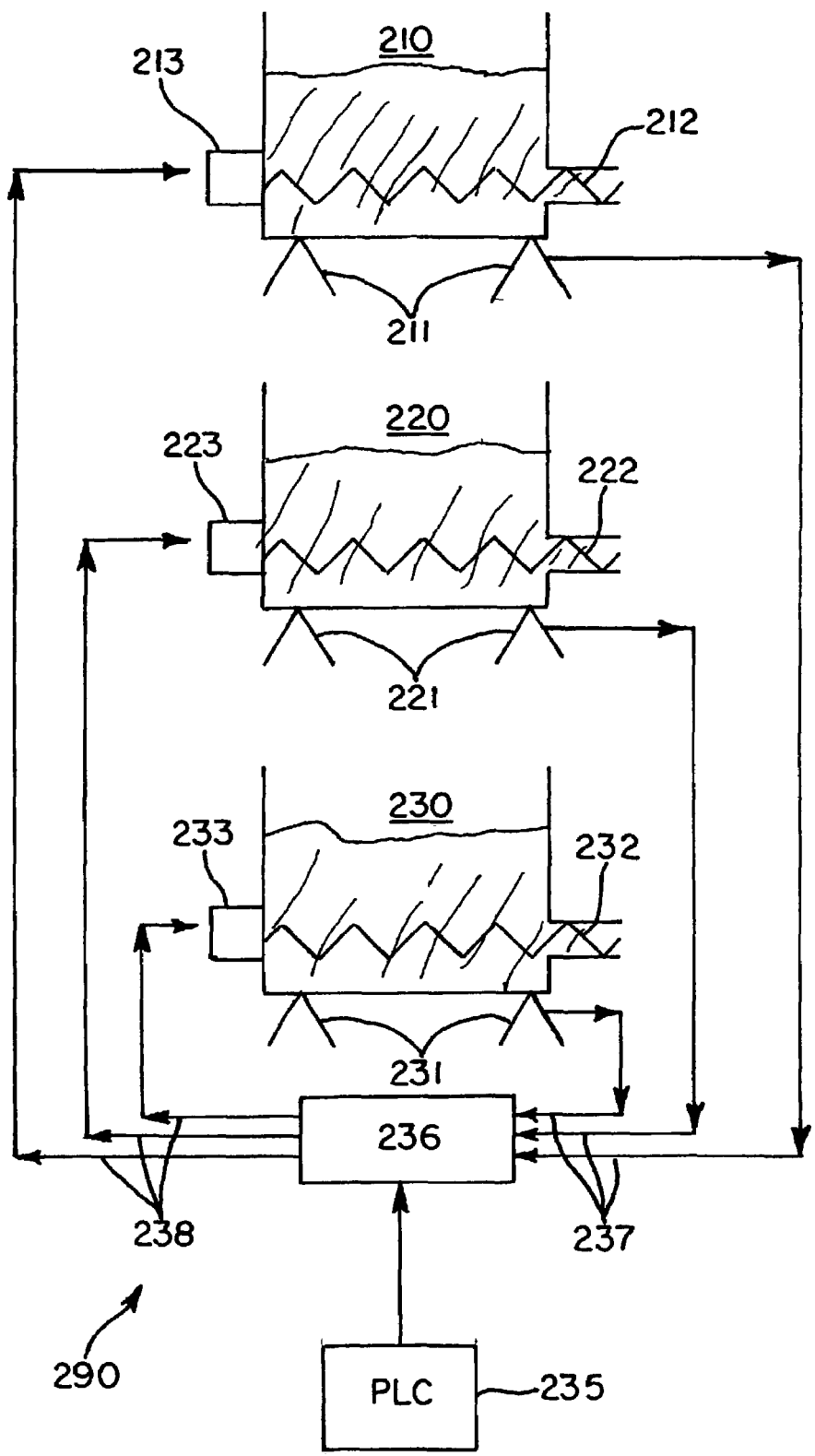
FIG. 5 illustrates the feeding system in accordance with the present invention.

FIG. 5 illustrates a feeding system in accordance with the present invention. Once the predetermined ratios are set by the operator into programmable logic controller (PLC) 235, the gravimetrical feeding of the chopped fiber and resin binder material is controlled by a feeding system 290. For example, as illustrated in FIG. 5, the feeding system 290 comprises the individual feeders 210, 220 and 230, a common feeder controller 236 and a set of load cells 211, 221 and 231 for each feeder. Each feeder has an electric motor 213, 223, 233 which drives a corresponding feeding mechanism or feed screw 212, 222 and 232 (such as an auger or roller with pins) to propel fibrous material from a storage hopper to a desired location (i.e., the belt conveyor 205). The respective motors are driven by an electrical signal received via output lines 238 from feeder controller 236, the signal ranging from 0-100% motor speed.

As shown in FIG. 5, each feeder 210, 220 and 230 rests on a corresponding sensitive load cell 211, 221 and 231. These load cells measure the weight of the feeder in small time increments (several times per second) and sends a signal to feeder controller 236 via one of the input lines 237 as the feeder is operating in the gravimetric mode. The feeder controller 236 calculates a feed rate over several of these time increments, and adaptively adjusts the motor speed of the feeder to compensate by sending a signal via output lines 238 to the respective motors 213, 223 and 233. Thus, the average feed rate required to obtain the desired ratio can be achieved over the operating period to convey and mix materials for the resultant preform. Although in the preferred embodiment, a single feeder controller 236 preferably monitors all feeders simultaneously during operation, each feeder can have its own individual feeder controller.

Once all parameters have been initialized, the operation proceeds with sequential deposition of chopped fibrous materials and resin binder material onto conveyor belt 205 (Step S2). The layers are then mixed in a mixing step by material handling fan 240 (Step S3) and conveyed in an air volume to cyclone dust collector 260. There, the mixture of chopped fibrous material and resin binder is separated from the air volume and deposited into the rotating mold 270 (Step S4). Once the mold is filled to a desired level, a drag chain conveyor (not shown in FIG. 2) is provided to transport the mold of mixed materials to be consolidated. This provides a semi-continuous process of part fabrication, since the feeders contain sufficient material to make many individual parts. Thus, when one "filled" mold is conveyed away from underneath cyclone dust collector 260, another "empty" mold moves in and the filling cycle is repeated.

Once a mold 270 is filled to a desired level and removed from underneath the cyclone dust collector 260, a consolidation process is performed by heating the fiber and resin mixture, and subsequently compacting the ingredients in mold 270 to obtain an intermediate fiber-reinforced composite part of a desired shape (Step S5). During compacting, the softened resin coats and impregnates the fibrous material. After the mold is cooled below the resin softening point, the intermediate composite part or preform is ejected from the mold and subjected to follow-on heating and densification treatments so as to obtain a final, fully-densified composite part (Step S6).

Figure 6:
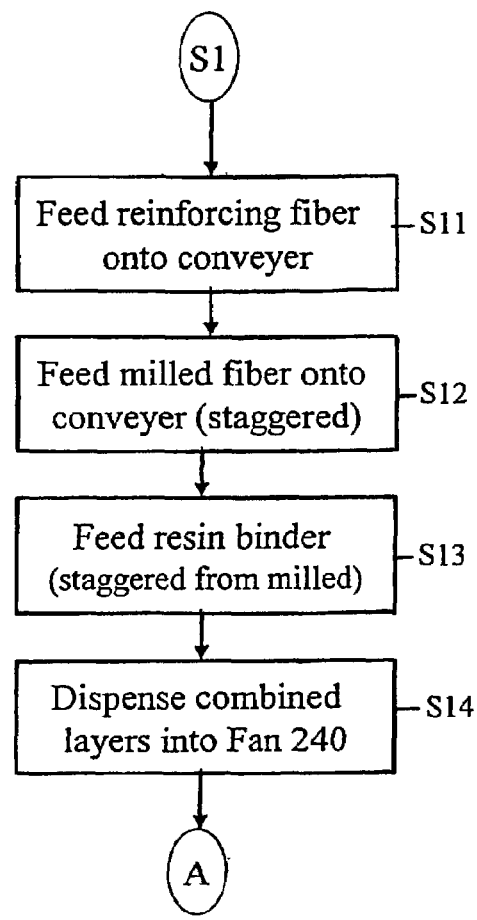
FIG. 6 illustrates the layer deposition step of FIG. 4 in more detail.
Figure 7:
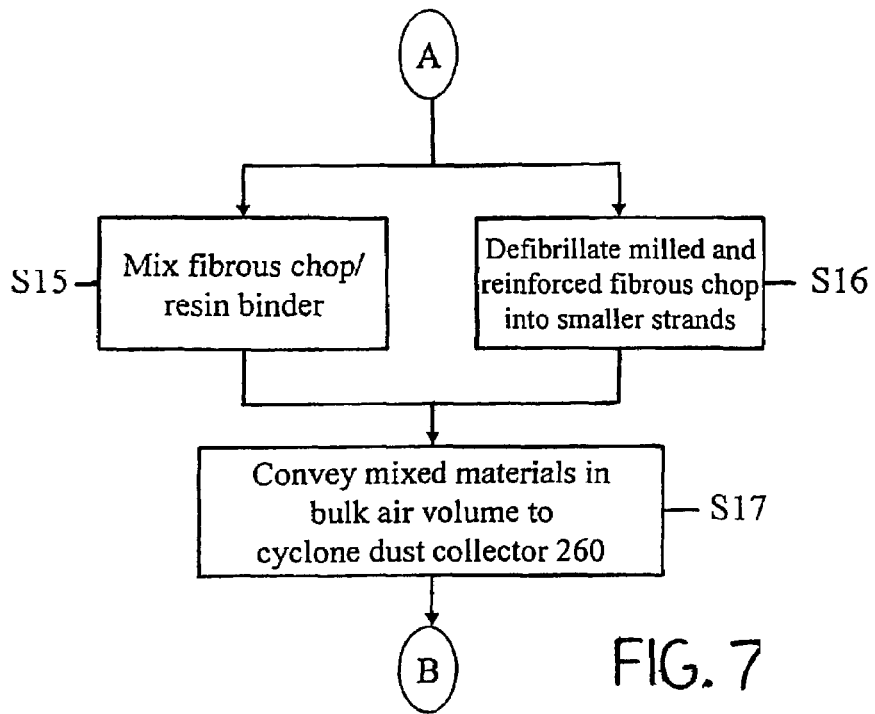
FIG. 7 illustrates the mixing step of FIG. 4 in more detail.
Figure 8:
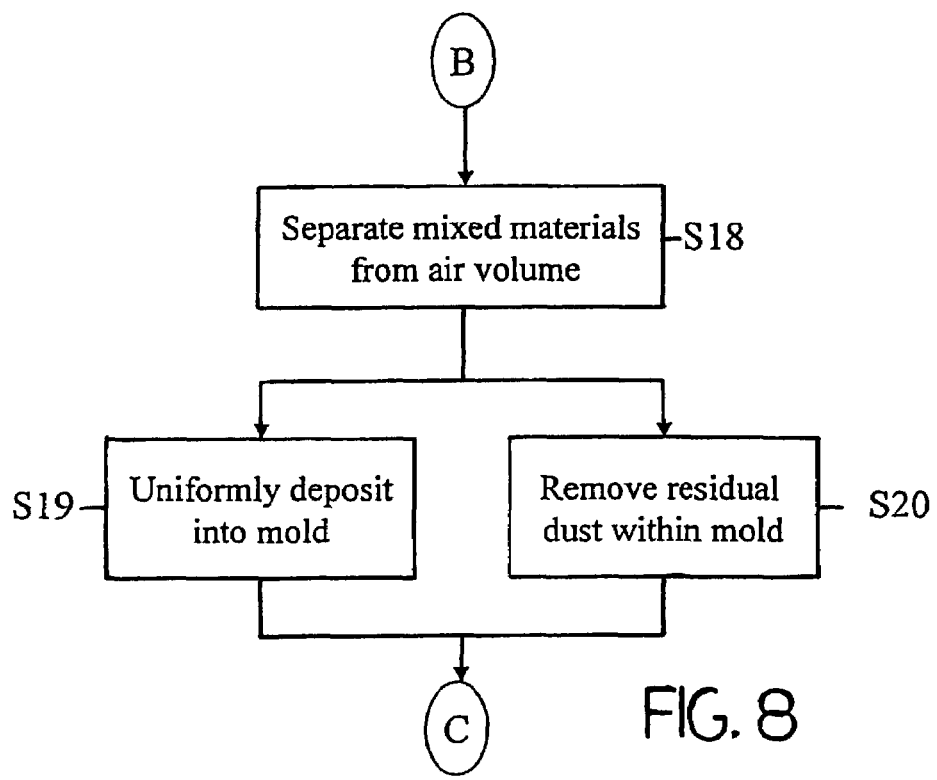
FIG. 8 illustrates the mold deposition step of FIG. 4 in more detail.
Figure 9:
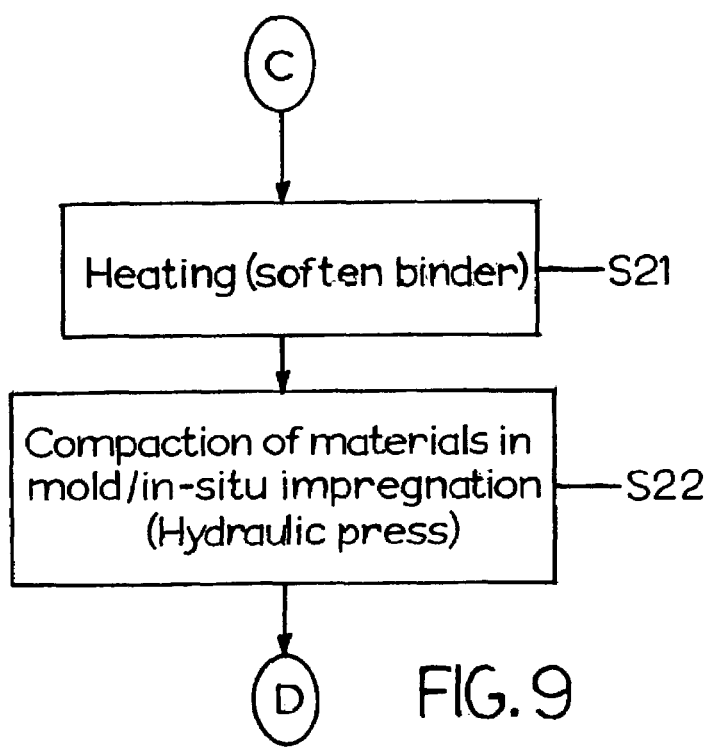
FIG. 9 illustrates the consolidation step of in more detail.

FIGS. 6-10 illustrate the steps of FIG. 4 in more detail. In FIG. 6, Steps S11-S14 correspond to Step S2 of FIG. 4. In FIG. 7, Steps S15-S17 correspond to Step S3 of FIG. 4. In FIG. 8, Steps S18-S20 correspond to Step S4 of FIG. 4. In FIG. 9, Steps S21 and S22 correspond to Step S5 in the process outlined in FIG. 4; and in FIG. 10, Steps S23-S28 correspond to Step S6 of FIG. 4.

Referring to FIG. 6, once all parameters have been initialized (completion of Step S1 in FIG. 4), the operation begins with the first feeder 210 gravimetrically depositing the reinforcing fibers at a first predetermined rate onto belt conveyor 205 (Step S11). The milled fibers and resin binder material from feeders 220 and 230 each have a staggered start such that the milled fiber chop and resin binder materials are successively and gravimetrically deposited on top of the reinforcing fiber chop as the conveyor belt 205 passes underneath (Steps S12-S13). This forms a continuous trilayer of materials (or more or less layers) on conveyor belt 205, which is subsequently dispensed into a material handling fan 240 (Step S14).

Referring to FIG. 7, the mixing step S3 carried out by material handling fan 240 has several purposes: it provides the air flow which will convey the combination of fibrous chop and resin binder material to the mold 270. More importantly, it mixes together the layered materials (Step S15) while simultaneously defibrillating the reinforcing and milled fibrous chop materials into smaller fiber strands (Steps S16). The defibrillation step further breaks up the reinforcing fibers and milled fibers into smaller strands to promote even better mixing with the resin binder material in material handling fan 240.

The use of material handling fan 240 allows control over the amount of desired defibrillation. Particularly, and unlike conventional liquid slurry processes for example, where defibrillation is complete in breaking up a fiber tow into individual filaments, material handling fan 240 allows for a wide range of defibrillation, breaking up the chopped fibrous material into smaller filament bundles ranging from hundreds of filaments to almost 10,000 filaments, thereby preserving strength while providing improved wear properties for the resultant finished composite part. The amount of defibrillation is governed by the material handling fan speed. Keeping in mind that a minimum amount of air volume and velocity is required to convey the materials (i.e. 50% maximum speed), a lower fan speed provides less defibrillation. After mixing and defibrillation, the "mixed materials" are conveyed via line 245 to a cyclone dust collector 260 (Step S17).

Referring to FIG. 8, the cyclone dust collector 260 acts as a separator, in conjunction with a return air fan 250. Specifically, the "fluid" entering cyclone dust collector 260 is a mix of the defibrillated fibrous chopped materials and resin binder materials entrained in a bulk volume of air. The return air fan 250 acts as a vacuum to circulate the bulk of this air volume back to the material handling fan 240 via a line 255. This air removal process allows the mixed materials to gently exit the bottom of the cyclone dust collector 260 so that they are deposited into the rotating mold 270 (Step S18).

To further promote uniform dispersion of the mixed materials in to the mold 270, the mold is rotated during deposition by turntable 272 (Step S19). As the mold fills with the mixed materials, a dust filter fan 285 simultaneously creates a suction on mold 270 that removes any entrained dust that is present when the mixed materials fill the mold 270 (Step S20).

Referring to FIG. 9, once the mold 270 is filled to a desired level, it is placed in an oven and heated to a temperature sufficient to soften and/or melt the resin binder material, preferably at about 300° C. and 1 ATM (Step S21). After heating is completed, the mixed material is compacted using a suitable method such as a hydraulic press, for example, to impregnate the fiber tows and to obtain the desired final shape of the intermediate composite part/preform (Step 22).

Figure 10:
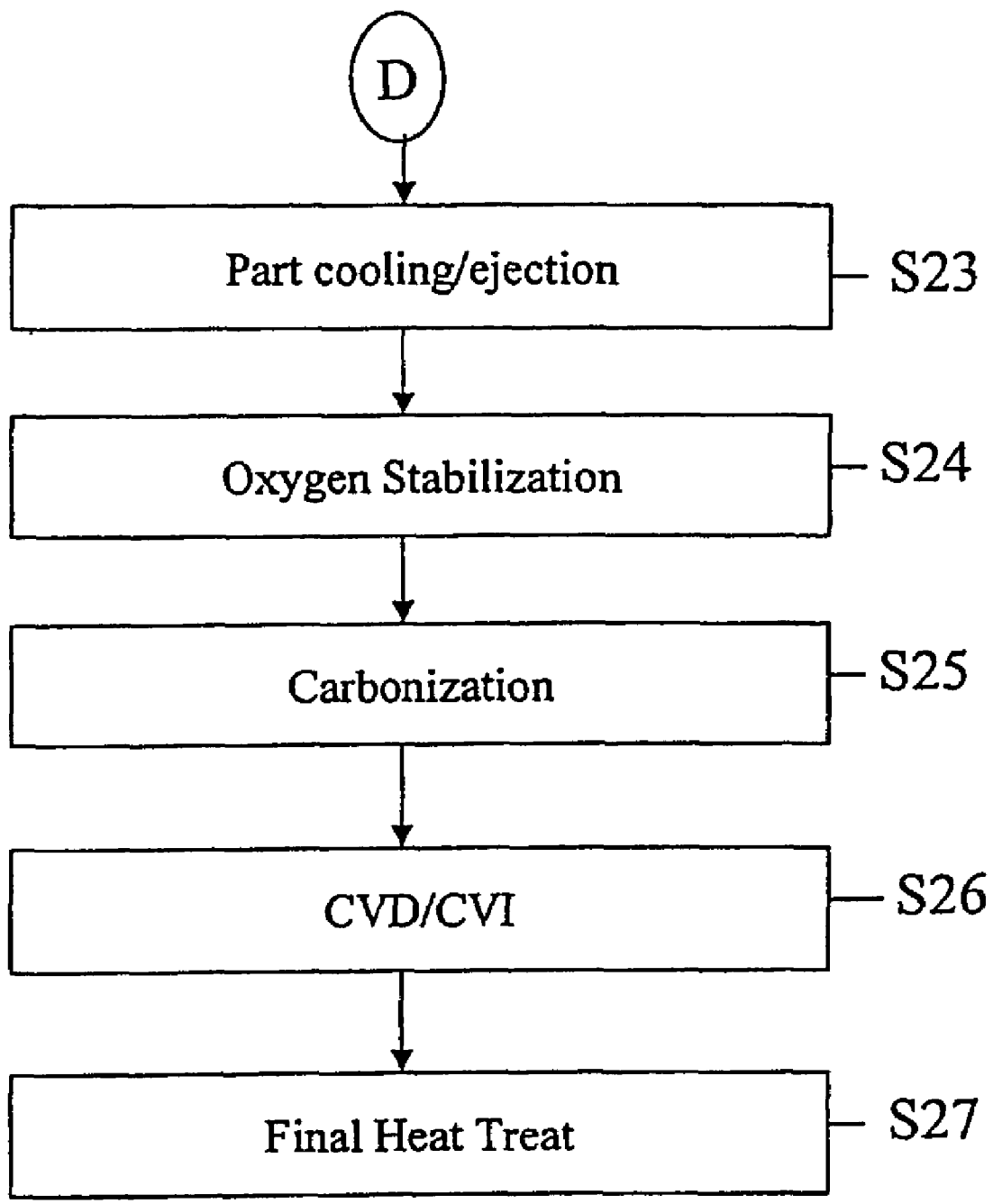
FIG. 10 illustrates the follow-on heating and densification step of FIG. 4 in more detail.

Referring to FIG. 10, the preform is cooled in the mold 270 until the resin binder material solidifies, and is then ejected from the mold 270. (Step S23). The preform then undergoes oxygen stabilization (Step S24) whereby it is heated in circulating air (preferably about 170° C.) for an extended period. Alternatively, this step could be performed in a cyclic pressure device (sometimes called an iron lung), by thermally shocking the preform to develop cracks, or by subjecting the preform to a high pressure oxygen treatment at about 40 psi. Following oxygen stabilization, the preform is subjected to carbonization, where it is slowly heated (preferably between 1°/min to 1°/hr) to about 600-900° C. in nitrogen at atmospheric pressure (Step S25). Following carbonization, the preform undergoes a chemical vapor deposition (CVD)/chemical vapor infiltration (CVI) process for up to about 600 hours to achieve full density (Step S26). CVD/CVI includes approximately 50-200 hours of CVD/CVI infiltration followed by at least 400 hours or more of CVD/CVI cycles, or densification can be performed by resin transfer molding (RTM) cycles, to fully densify the preform. A final heat treat is performed in a standard temperature range of 1600-2200° C. thereafter to obtain a near final (machining is also typically required) fiber-reinforced composite part such as a carbon-carbon composite aircraft brake disc (Step S27).

EXAMPLE

Several test parts were fabricated using the above method and apparatus, specifically nine (9) stator and six (6) rotor-size parts for 767 aircraft made by the BOEING Corporation. For a stator, 3.976 pounds (1807 g) of 1-inch (2.54 cm) chop length carbon fiber (grade X9755) and 1.454 pounds (661 g) of milled carbon fiber (grade 341, each grade of fibers marketed by FORTAFIL), and 7.176 pounds (3262 g) of AR mesophase pitch resin (pellets ground into powder) marketed by the MITSUBISHI Gas Chemical Corporation were dispensed onto a belt conveyer over approximately a thirteen (13) minute period (a total of 12.606 pounds or 5723 g of "mixed material" was deposited in the mold over the time period to form a preform). The material handling fan was operating at 80% of the maximum motor speed, the return air fan at 37% of maximum motor speed and dust collector fan at 60% of maximum motor speed. The mold was located at a 2.5 inch (6.35 cm) linear position from the centerline of the cyclone dust collector and was turning 6 rpm during deposition.

For this example, the stator part was built up in two equal batches, due only to the current limitation of the 1-inch chopped fiber feeder's hopper capacity. After the fibrous and binder materials were mixed and dispensed in the mold, the mold was placed into an air circulating oven and heated to a temperature of 315° C. for four hours. After heating, the preform was compacted with 30 tons of force until mechanical stops were met. The preform thickness was maintained at 1.405" (3.569 cm) until cool, and then was removed from the mold. The density of the 5490 g weight preform was measured at 1.35 g/cc.

Therefore the method and apparatus in accordance with the preferred embodiment enables the production of fiber-reinforced composite parts suitable for use in manufacturing various high-friction components for applications such as automobile, truck, and aircraft brakes. The density of the envisioned composite parts are between 1.2 and 1.5 g/cc. By combining low-cost chopped PAN-based carbon fibers with a high carbon yielding mesophase pitch matrix resin, a carbon/carbon composite material with improved friction and wear performance can be produced in fewer processing steps as compared to current techniques used to fabricate fiber-reinforced composite materials, thereby providing increased reliability and reduced process cycle times. Such friction materials would typically have a density of at least 1.7 g/cc.

The invention being thus described, it will be obvious that the same may be varied in many ways. For example, the constituent transport arrangement below feeders 210, 220 and 230 of FIG. 2 may be a plurality of belt conveyors, each feeder having their own designated belt conveyer to transport the respective materials to a common mixing point. In another embodiment, a fourth feeder may be added to the apparatus in FIG. 2 to deposit other performance modifying additives which might be necessary in forming the resultant composite part. These additives can include materials such as metals, ceramic particles, graphite, cokes, curing agents, mica, carbon oxidation inhibitors, glass or polymer films, or any other agents or materials which improve friction and wear characteristics of a composite part and/or to further strengthen the fibrous/binder materials used to fabricate the composite part. Alternatively, these additives may be mixed in with the resin binder material at feeder 230 to conserve space.

Additionally, in lieu of or in addition to performing oxygen stabilization (Step 24) of the intermediate part (FIG. 9), a support or constraint fixture may be utilized during carbonization (Step S25) to prevent bloating and maintain part shape. Further regarding FIG. 9, an optional heat treat (HTT—High Temperature Treatment) may be performed between carbonization (Step S25) and CVD/CVI (Step S26), heating the preform at about 1°/min to about 1800° C. Such variations are not to be regarded as a departure from the spirit and scope of the invention, and all such modifications as would be obvious to one skilled in the art, are intended to be included within the scope of the following claims.

What is claimed is:

1. An apparatus for forming fiber reinforced composite parts, said apparatus comprising:
a plurality of feeder mechanisms for gravimetrically feeding chopped or milled fibrous materials and resin binder materials at specified rates onto a constituent transport arrangement so that said resin material and said fibrous materials are in a predetermined ratio;
a mixer for mixing said fibrous and resin materials received from said constituent transport arrangement; and
a conveyance medium for depositing said mixed materials in a mold of desired shape.

2. The apparatus of claim 1, wherein said constituent transport arrangement is a single belt conveyor which receives a continuous stacked layer of fibrous and binder materials.

3. The apparatus of claim 1, wherein said fibrous materials include chopped or milled carbon fibers of various lengths, and wherein said binder material includes a powdered matrix resin binder.

4. The apparatus of claim 1, wherein said fibrous materials include chopped or milled carbon fibers up to about 1.5 inches in length.

5. The apparatus of claim 1, wherein said fibrous materials include first and second portions of chopped or milled carbon fibers of various lengths, said first portion of carbon fiber greater in length than said second portion.

6. The apparatus of claim 1, further comprising a collector for collecting said mixed materials, wherein said mixer includes a first fan for mixing said fibrous and binder materials, and wherein said conveyance medium is an airflow volume provided by said first fan to convey said mixed materials to said collector.

7. The apparatus of claim 6, wherein said collector includes a second fan which circulates substantially all of said airflow volume back to said first fan so that said mixed materials are separated therefrom in said collector, exiting a bottom of the collector to accumulate in said mold.

8. The apparatus of claim 1, wherein said constituent transport arrangement includes a plurality of conveyors, each associated with a corresponding feeder to convey layers of fibrous and binder materials separately from each other to be combined at said mixer.

9. The apparatus of claim 1, wherein said mold may be rotated while receiving said mixed materials to provide uniform dispersion of fibrous and binder materials therein.

10. The apparatus of claim 1, further including a rotational device which supports said mold, wherein said rotational device imparts rotational and linear motion to said mold during deposition of said mixed materials to provide uniform dispersion of fibrous and binder materials within said mold.

11. The apparatus of claim 1, wherein said mold includes means for heating without curing and for compacting to form an intermediate composite part.

12. The apparatus of claim 1, wherein one of said plurality of feeders deposits said resin material mixed with performance modifying additives on said constituent transport arrangement.

13. The apparatus of claim 1, wherein one of said plurality of feeders deposits performance modifying additives on said constituent transport arrangement.

14. An assembly comprising an apparatus for forming fiber-reinforced composite parts, chopped or milled carbon fibers, and powdered matrix resin binder, said assembly comprising:
   a plurality of feeder mechanisms for depositing a portion of chopped or milled carbon fibers and a portion of powdered matrix resin binder in predetermined ratios onto a constituent transport arrangement;
   a mixer for mixing said carbon fiber and said powdered matrix resin binder portions to form mixed materials;
   a mold for receiving said mixed materials from said mixer; and
   said mixed materials in said mold, wherein said mixed materials are substantially uniformly dispersed in said mold so that subsequent heating of said mold enables in-situ impregnation of said carbon fiber portions with said powdered matrix resin binder portions.

15. The assembly of claim 14, wherein said portions are successively layered on top of each other in a predetermined ratio.

* * * * *